United States Patent
Patel

(10) Patent No.: US 9,146,952 B1
(45) Date of Patent: *Sep. 29, 2015

(54) SYSTEM AND METHOD FOR DISTRIBUTED BACK-OFF IN A DATABASE-ORIENTED ENVIRONMENT

(71) Applicant: Amazon Technologies, Inc., Reno, NV (US)

(72) Inventor: Rajesh Shanker Patel, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/867,794

(22) Filed: Apr. 22, 2013

Related U.S. Application Data

(63) Continuation of application No. 13/074,985, filed on Mar. 29, 2011, now Pat. No. 8,429,120.

(51) Int. Cl.
*G06F 17/30* (2006.01)

(52) U.S. Cl.
CPC ................................ *G06F 17/30377* (2013.01)

(58) Field of Classification Search
USPC .................................................. 707/607, 704
See application file for complete search history.

(56) References Cited

U.S. PATENT DOCUMENTS

| | | | |
|---|---|---|---|
| 6,728,719 B1 | 4/2004 | Ganesh et al. | |
| 7,293,163 B2 | 11/2007 | Caprioli et al. | |
| 7,653,664 B2 | 1/2010 | Chitre et al. | |
| 7,774,219 B1* | 8/2010 | Meredith et al. | 705/7.27 |
| 7,979,399 B2 | 7/2011 | Barsness et al. | |
| 2002/0004843 A1* | 1/2002 | Andersson et al. | 709/238 |
| 2002/0093954 A1* | 7/2002 | Weil et al. | 370/389 |
| 2005/0021567 A1 | 1/2005 | Holenstein et al. | |
| 2008/0069138 A1* | 3/2008 | Acharya et al. | 370/468 |
| 2008/0109494 A1 | 5/2008 | Chitre et al. | |
| 2008/0235294 A1* | 9/2008 | Girkar et al. | 707/202 |
| 2009/0064160 A1 | 3/2009 | Larson et al. | |
| 2009/0204570 A1 | 8/2009 | Wong | |
| 2009/0320029 A1* | 12/2009 | Kottomtharayil | 718/102 |
| 2010/0191712 A1* | 7/2010 | Wolman et al. | 707/704 |
| 2010/0332449 A1 | 12/2010 | Holenstein et al. | |
| 2011/0167243 A1 | 7/2011 | Yip et al. | |

* cited by examiner

*Primary Examiner* — Cam-Linh Nguyen
(74) *Attorney, Agent, or Firm* — Robert C. Kowert; Meyertons, Hood, Kivlin, Kowert & Goetzel, P.C.

(57) ABSTRACT

Embodiments may include a system configured to, for each of multiple database partitions, generate a respective value of commit latency dependent on the latency of one or more previous commit operations directed to that database partition. The system may also be configured to, for a given work item that includes a commit operation to be initiated on a given database partition of said multiple database partitions, determine whether the value of the commit latency for the given database partition exceeds a configurable commit latency threshold. The system may be configured to, in response to determining that the value of the commit latency for the given database partition exceeds the commit latency threshold, postpone the given work item to reduce load on the database partitions and perform the given work item after the postponement. If the commit latency does not exceed the threshold, the work may be performed without the postponement.

20 Claims, 7 Drawing Sheets

FIG. 2  ⸺ 200

| DATABASE PARTITION | N-MOST RECENT COMMIT LATENCIES MEASURED (ms) | MEDIAN COMMIT LATENCY (ms) |
|---|---|---|
| 118A | 100, 150, 155, 300, 240, 100, 220 ... | 155 |
| 118B | 205, 150, 260, 120, 100, 115, 110 ... | 120 |
| 118C | 75, 80, 75, 85, 100, 120, 105 ... | 85 |
| ⋮ | ⋮ | ⋮ |
| 118N | 100, 160, 155, 200, 240, 100, 170 ... | 160 |

FIG. 3  ⸺ 300

| DATABASE PARTITION | N-MOST RECENT COMMIT LATENCIES MEASURED (ms) | MEAN COMMIT LATENCY (ms) |
|---|---|---|
| 118A | 100, 150, 155, 300, 240, 100, 220 ... | 181 |
| 118B | 205, 150, 260, 120, 100, 115, 110 ... | 151 |
| 118C | 75, 80, 75, 85, 100, 120, 105 ... | 91 |
| ⋮ | ⋮ | ⋮ |
| 118N | 100, 160, 155, 200, 240, 100, 170 ... | 161 |

FIG. 5  ⸺ 500

| WORK TYPE (PRIORITY LEVEL) | COMMIT LATENCY THRESHOLD (ms) |
|---|---|
| 1 | N/A |
| 2 | 175 |
| 3 | 200 |
| ⋮ | ⋮ |
| N | 600 |

SYSTEM AND METHOD FOR DISTRIBUTED BACK-OFF IN A DATABASE-ORIENTED ENVIRONMENT

This application is a continuation of U.S. application Ser. No. 13/074,985, filed Mar. 29, 2011, now U.S. Pat. No. 8,429,120, which is incorporated by reference herein in its entirety.

BACKGROUND

In database-oriented services, fulfilling service requests may include performing one or more calls to databases storing information related to the service. In these types of services, database performance may influence the availability and throughput of the overall service's ability to process requests. If databases are healthy, the service will likely remain available with sufficient throughput. However, if a database is overloaded with too many concurrent database operations, database performance and throughput may decline due to reduced operational health and efficiency. One approach to promote the performance of database-oriented services is to size the database capacity above the requirements of the service. However, even in these cases, the service can receive an uncharacteristically high quantity of incoming requests. Moreover, database capacity may temporarily decrease due to failures within the database hardware or software. Accordingly, even in cases where database capacity is originally sized above the requirements of the service, a database can become over-loaded, ultimately creating a backlog in the requests to be processed by the relying service and increasing the risk of database failure and service outage. Even in cases where a complete service outage does not occur, overloaded databases may reduce efficiency and throughput of relying services.

BRIEF DESCRIPTION OF THE DRAWINGS

FIG. 2 illustrates an example table that may be maintained by host systems to track median commit latency for each of multiple database partitions, according to some embodiments.

FIG. 3 illustrates an example table that may be maintained by host systems to track average commit latency for each of multiple database partitions, according to some embodiments.

FIG. 5 illustrates a table that maps categories of work (e.g., work types or priorities) to commit latency thresholds, according to some embodiments.

While the system and method for distributed back-off in a database-oriented environment is described herein by way of example for several embodiments and illustrative drawings, those skilled in the art will recognize that the system and method for distributed back-off in a database-oriented environment is not limited to the embodiments or drawings described. It should be understood, that the drawings and detailed description thereto are not intended to limit the system and method for distributed back-off in a database-oriented environment to the particular form disclosed, but on the contrary, the intention is to cover all modifications, equivalents and alternatives falling within the spirit and scope of the system and method for distributed back-off in a database-oriented environment as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
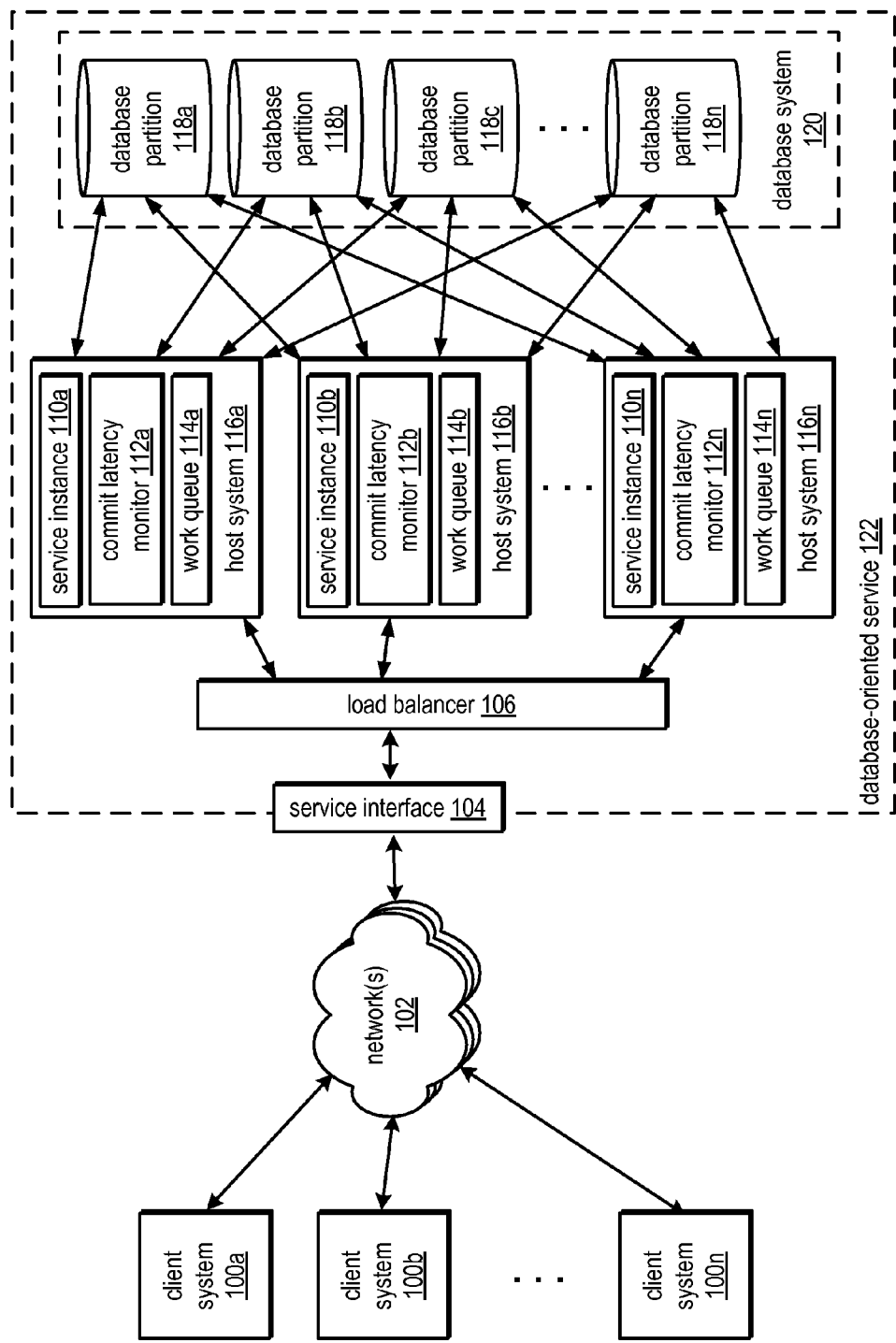
FIG. 1 illustrates a block diagram of an example system configuration including a database-oriented service and multiple clients of such service, according to some embodiments.

Various embodiments of a system and method for distributed back-off in a database-oriented environment are described. FIG. 1 illustrates a block diagram of an example system configuration including a database-oriented service and multiple clients of such service, according to some embodiments. In the illustrated embodiment, a database-oriented service 122 may be configured to service requests from one or more clients systems, such as client systems 100a-n. In various embodiments, database-oriented service 122 may be configured as a service adhering to the general principles of service oriented architecture (SOA). The database-oriented service may be configured to perform a variety of functions, such as managing payment processing in a commerce environment, which is described in more detail with respect to later Figures.

In FIG. 1, a given client system may issue or submit a request to service interface 104 over one or more electronic networks configured to communicate information or data. One example of such a network is described below with respect to network 885 of FIG. 8. In various embodiments, service interface 104 may provide a common address (e.g., an Internet Protocol (IP) address) to which client requests may be directed. Requests received at the service interface may be forwarded to a load balancer 106, which may be configured to send a given request to one of the illustrated host systems (or "hosts") in accordance with a load balancing protocol. In various embodiments, any type of load balancing protocol may be utilized, whether such protocol is presently known or developed in the future. Generally, the load balancing technique employed by the load balancer seeks to evenly (or nearly evenly) distribute the requests among host systems 116a-116n.

Each host system may include a service instance, illustrated as service instances 110a-110n. The service instance 110a may be configured to process client requests sent to the service. For instance, requests may specify one or more work items to be performed and the service instances may be configured to perform such work items. For instance, if database-oriented service 122 were a payment service, the service instances may obtain an authorization (or reservation) for a specific amount of funds to be debited from a customer account. In another example, the service instance may obtain settlement of funds upon (or near) the conclusion of a transaction with a customer. In the illustrated database-oriented service, performing work items may also include issuing (or initiating) one or more commit operations to database partitions 118a-118n of database system 120. Database partitions may be different databases, different portions (e.g., tables or groups of tables) of the same database, or different portions of different databases. In some embodiments, database partitions may be horizontal partitions or "shards."

In one example, the database oriented service may be a payment service, and database partitions 118a-118n may store the state of multiple transactions processed by the payment service. For instance, throughout the course of a transaction processed by such payment service, the transaction's state may transition from an initiated state (e.g., recorded, but prior to fund authorization/reservation), an authorized state (e.g., funds have been reserved), a settled state (e.g., processing of the transaction is closed and funds have been debited), or even a canceled state (e.g., the transaction has been canceled and any reserved funds have been released). In various embodiments, the illustrated service instances may issue commit operations to update the state of transactions within the database partitions. In other cases, the service instances may issue commit operations to perform other types of work items, which need not be related to a financial transaction or purchase.

Also illustrated, each host system 116a-116n includes a respective commit latency monitor 112a-112n. In some embodiments, a host system's service instance and commit latency monitor may act in conjunction to perform the database back-off functionality described herein, as described in more detail below. In various embodiments, a host system's commit latency monitor may determine and/or record the latency of any database commit operation issued by the host's service instance. Generally, the commit latency may be a measure of the time between when a commit latency is initiated and when that commit latency is completed. Some variation or deviation from this general measure may exist due to network or communication latencies between the hosts and the database partitions and/or due to the specific measurement technique employed. In various embodiments, the commit latency monitor of a host may utilize timestamps of operations in order to determine the latency of a commit operation. For example, the commit latency monitor may determine the temporal difference between the timestamp of an initiate operation to initiate a commit operation on a particular database partition and a timestamp of a database partition response indicating that commit operation has been completed.

Each commit latency monitor may use the measured latencies as an indicator of database load. Generally, higher commit latencies on a database partition may be indicative of higher load on that database partition. Knowledge of the latencies may be utilized to implement the distributed back-off feature described herein. For instance, when the measured commit latencies of a particular database partition measured by a commit latency monitor are high, the respective service instance on the same host may back-off (e.g., postpone) commit operations sent to that partition in order to allow that partition to recover from its current state of high workload. In this way, commit latency may be utilized to enable the database partitions to remain healthy instead of increasing the load on an already loaded database partition, thereby decreasing the risk of total database partition failure.

In various embodiments, the commit latency monitors may generate values of commit latency on a per-host, per-partition basis. FIGS. 2 and 3 illustrate example commit latency values generated by a commit latency monitor. As described with respect to subsequent Figures, these measurements may be utilized to determine whether a given work item is to be backed-off in (e.g., postponed) in certain circumstances. In various embodiments, table 200 may be an example of one type of information generated and maintained by the commit latency monitor of each host system. As illustrated by the rows of table 200, a given commit latency monitor may record the commit latencies for the n-most recent commit operations performed by the host. The quantity of most recent commit latencies retained may be configurable in various embodiments. In various embodiments, the commit latency monitor may perform a statistical analysis to determine a single latency value based on the n-most latency values. As illustrated in table 200, this may include the commit latency monitor generating the median of that sample for each database partition. In other cases, as illustrated in table 300 of FIG. 3, the commit latency monitor may generate the median of each database partition's sample of n-most recent commit latencies. In various embodiments, either the mean or the median latency values may be utilized. However, in some cases, use of the median latency values may provide results that are less susceptible to one (or a few) large values skewing the latency value of the entire sample, as may be the case for statistical averages (or "means").

Returning to FIG. 1, the illustrated commit latency monitors may use the median commit latency values (or in some cases the mean latency values) generated according to the techniques described above in order to determine whether work items are to be backed-off (e.g., postponed) at least temporarily. In various embodiments, the work items may include work items specified by client requests and/or work items that are queued within work queues 114a-114n. Various techniques by which work items may be backed off are described in more detail below with respect to FIGS. 4 and 6. Generally, before performing a work item directed to a particular database partition, a host's service instance may query the commit latency monitor to determine whether the median commit latency is above a configurable threshold. If the median commit latency is above that threshold, the service instance may back-off (e.g., postpone) the work item at least temporarily in order to reduce the load on the database partitions. If the median commit latency is below the threshold, the service instance may perform the work item (including any necessary database operation) without a postponement. Also described in more detail below, different work items may be categorized into different categories associated with different latency thresholds. In this way, for a given database load, some types of work (e.g., lower priority work) may be backed-off at least temporarily while other types of work (e.g., higher priority work) may be performed without a postponement. In some configurations, work items of certain categories (e.g., the highest priority work) may intentionally not be postponed based on commit latency under any circumstances.

Example Methods for Distributed Back-Off Based on Commit Latency

Figure 4:
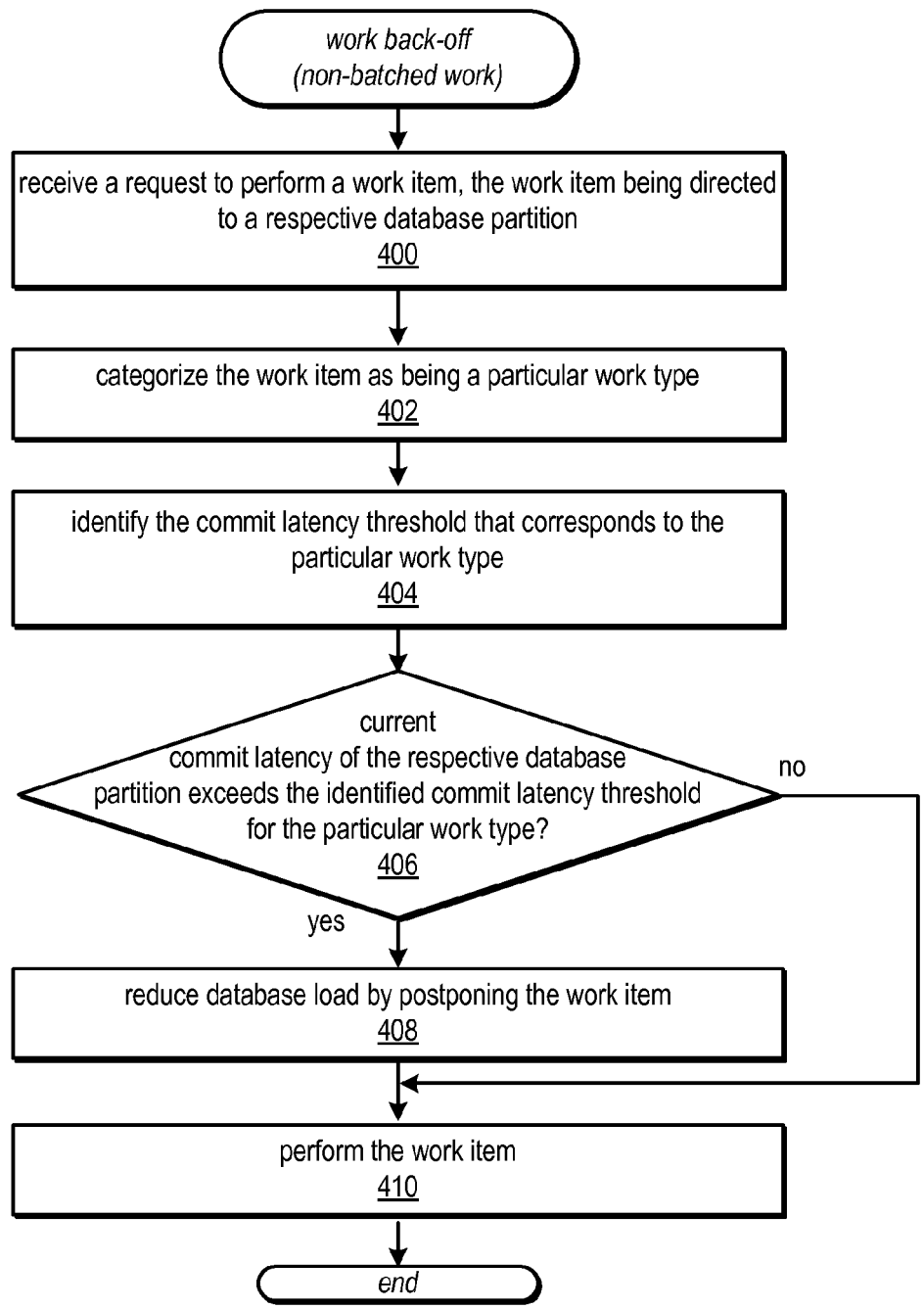
FIG. 4 illustrates a flowchart of an example method for backing-off non-batched work items, according to some embodiments.

Embodiments may perform various methods to implement the distributed back-off functionality described herein. FIG. 4 illustrates one example of such a method for non-batched worked items. Examples of non-batched work items include work items that are requested through service interface 104 but not queued in work queues 114a-n. In various embodiments, the method of FIG. 4 may be performed by a host system upon receipt of a work request (e.g., a request forwarded to that host by load balancer 106).

As illustrated at block 400, the method may include receiving a request to perform a work item (e.g., a request received at a host system from the load balancer), which may in some case be referred to as an online request. In various embodiments, the requested work item may be directed to a particular database partition. For instance, different database partitions may store different datasets and the requested work item may be directed to a dataset of a particular database partition.

As illustrated at block 402, the method may include categorizing the requested work item as being a particular work type. For instance, work types may correspond to different task priorities. For example, within the context of a payment service, requests to authorize a transaction (e.g., reserve funds for a customer purchase) may belong to a higher priority category than a request to settle a transaction. For instance, shipment of an item purchased with funds from the transaction may be dependent on a successful authorization of funds. As shipment of an item on time may have a greater customer impact than the settlement of funds, the authorization may be designated as a higher priority type of work. Note that this is only one example of how work may be categorized in various embodiments. In general, any categorization that allows for multiple different types of work having different priorities may be utilized.

As illustrated at 404, the method may include identifying the commit latency threshold that corresponds to the particular work type. In various embodiments, this may include evaluating a table or other information similar to that of table 500 of FIG. 5. As illustrated in table 500, different work types (or priority levels of work) are mapped to different commit latency thresholds. In the illustrated example, the highest level work priority is not assigned a threshold because in various embodiments such work is not subject to being backed-off (e.g., postponed). The remaining work categories corresponding to priorities 2-n each have a corresponding commit latency threshold. Returning to FIG. 4, the method may include using the information of table 500 to determine the commit latency threshold that is to be used in the evaluation performed at block 406, as described below.

As illustrated at block 406, the method may include determining whether the current commit latency of the respective database partition exceeds the identified commit latency threshold for the particular work type of the work item requested. The current commit latency may include the most recent median (or mean) commit latency, such as that described above with respect to FIG. 2 (or FIG. 3 for mean commit latency). In various embodiments, these tables may be periodically or aperiodically updated by the host's commit latency monitor. As illustrated by the positive output of block 406, if the current commit latency of the respective database partition exceeds the identified commit latency threshold for the particular work type, the method may include postponing the work item at least temporarily in order to reduce the work load on the respective database partition (408). By backing-off work in this manner, the method may enable a database to recover from a high workload episode instead of overloading the database with additional work. As illustrated by the negative output of block 406, if the current commit latency of the respective database partition does not exceed the identified commit latency threshold for the particular work type, the work item is not postponed and processing proceeds to block 410. At block 410, the method includes performing the work item, which may include performing at least one commit operation on the respective database partition.

Figure 6A:
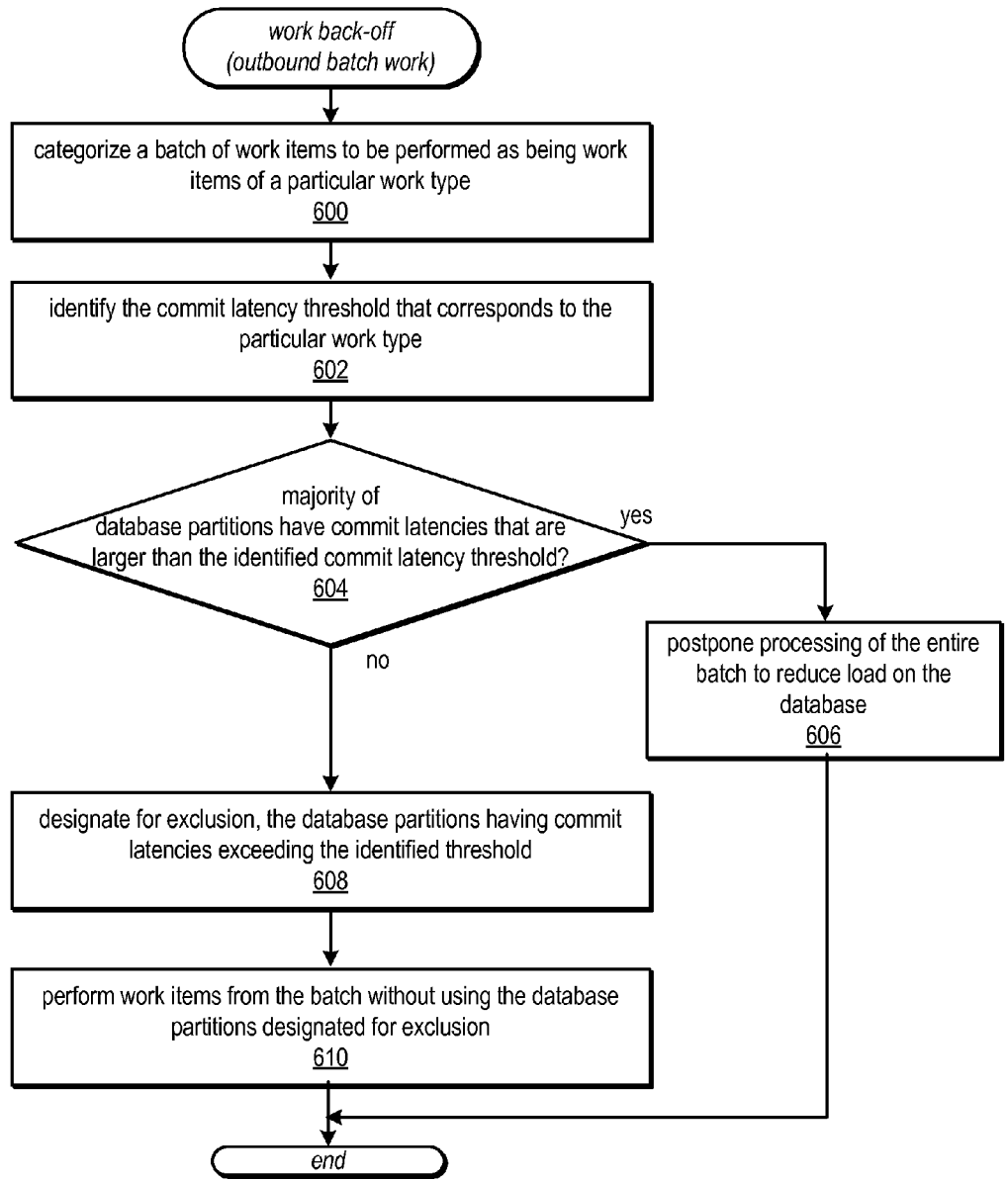
FIGS. 6A-6B illustrate flowcharts of example methods for backing-off batched work items, according to some embodiments.

FIG. 6A illustrates one example of such a method for batched worked items. Examples of batched work items include work items queued in work queues 114a-n. In some cases, work items on a host's queue may be scheduled to be performed by the host periodically or aperiodically. In various embodiments, the method of FIG. 6A may be performed by a host system just prior to the scheduled time at which a batch of work items is to be processed. For instance, a batch of work items may be scheduled to be performed every hour, and the illustrated method may be performed prior to that time. One example of this type of batch work includes the sending of outbound responses from the database-oriented service (e.g., to a payment processor system). Unlike inbound batch work (e.g., receiving responses from payment processor systems) in some embodiments, the nature of outbound work may enable hosts of the database-oriented service to directly control the specific database partitions that will participate in the outbound work (e.g., by virtue of which information is being sent and on what database partitions such information resides). While the service hosts may not directly control which partitions will be involved in the processing of inbound work (e.g., as this depends on upon what information is received from, e.g., a payment processor), it is worthwhile to note that the specific outbound work performed may influence the inbound work that returns to the database oriented service. For instance, if messages associated with a subset of the database partitions are sent out to a payment processor, any responses sent back in response will also pertain to that same subset of database partitions (in many configurations). In this way, limiting outbound batch work to certain partitions (see e.g., items 608-610 described below) may help throttle inbound batch work as well.

As illustrated at block 600, the method may include categorizing a batch of work items to be performed as being work items of a particular work type. For instance, the batch of work items may be a type of work associated with one of the priority levels illustrated in FIG. 5. As illustrated at block 602, the method may include identifying the commit latency threshold that corresponds to the particular work type of the batch. For instance, the method may include evaluating table 500 to determine the commit latency threshold that corresponds to the work type of the batch. At block 604, the method may include determining whether a majority of database partitions have commit latencies that are larger than the identified commit latency threshold. As illustrated by the positive output of block 604, if it is determined that a majority of database partitions have commit latencies that are larger than the identified commit latency threshold, then the method may include postponing processing of the entire batch or work items in order to reduce the load on the database (606). For instance, if a majority of the database partitions have commit latencies above the threshold, the database partitions may be heavily loaded and it may be more advantageous to allow the database to "catch up" in processing work as opposed to tasking the database partitions with more work (and possibly risking total database failure).

As illustrated by the negative output of block 604, the method may include designating for exclusion, the database partitions having commit latencies exceeding the identified threshold (608). For instance, if less than a majority of the database partitions are overloaded (as indicated by commit latency), it may be worthwhile to continue processing at least some of the batched work items while selectively excluding the already-loaded database partitions. At block 610, the method may include performing at least some of the work items from the batch without using the database partitions that were designated for exclusion. In various embodiments, if a work item of the batch is directed to a database partition marked for exclusion, the method may skip this item and leave it on the batch to be processed at a later time.

Figure 6B:
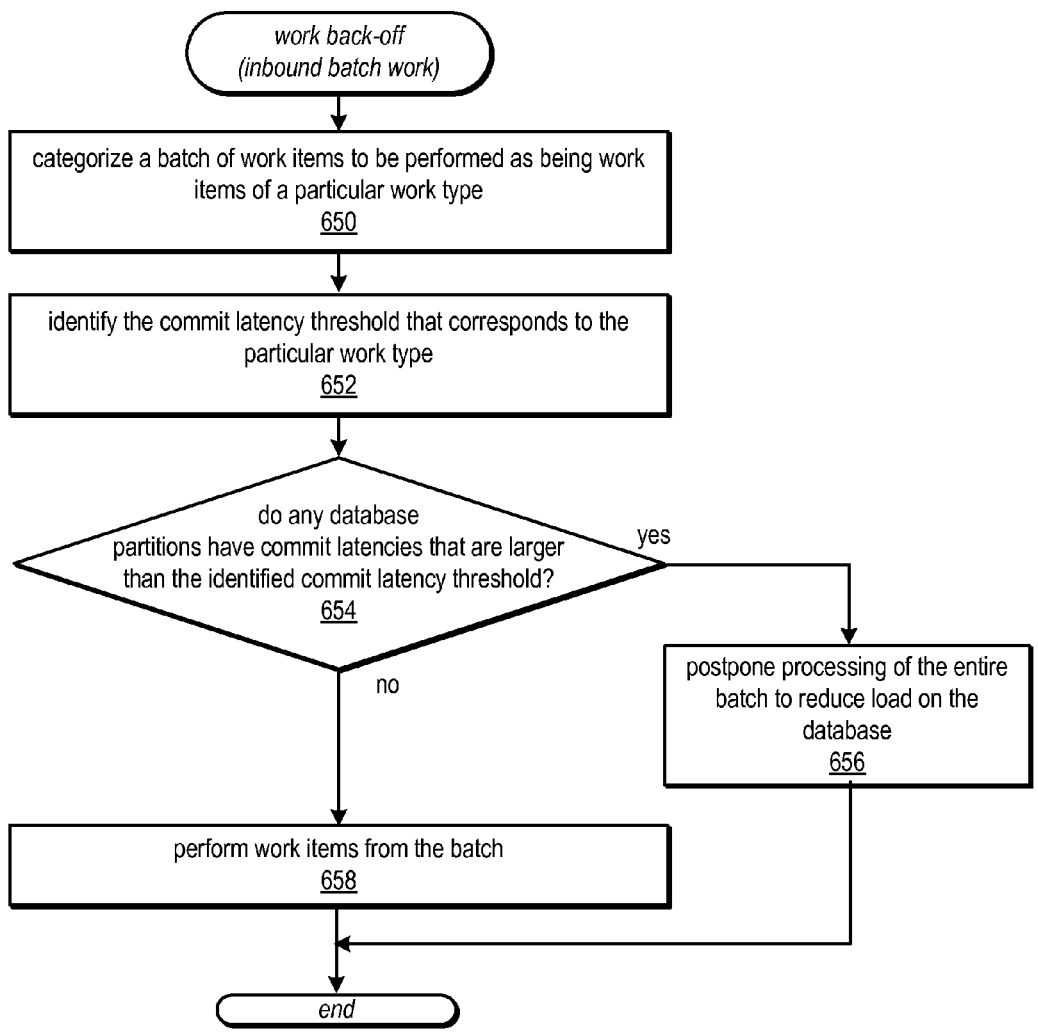

FIG. 6B illustrates another example of a method for batched worked items. One example of the type of batch work processed in FIG. 6B includes the receipt of inbound responses from a payment processor system (or other external client). Unlike outbound batch work (e.g., sending messages to payment processor systems) in some embodiments, the nature of inbound work may not enable hosts of the database-oriented service to directly control the specific database partitions that will participate in the inbound work (e.g., since the requests or messages received by the database-oriented service is largely dictated by what is sent by the payment processor systems or other clients). However, as described above, while the service hosts may not directly control which partitions will be involved in the processing of inbound work (e.g., as this depends on upon what information is received from, e.g., a payment processor), it is worthwhile to note that the specific outbound work performed may influence the inbound work that arrives at the database oriented service. For instance, if messages associated with a subset of the database partitions are sent out to a payment processor, any responses sent back in response will also pertain to that same subset of database partitions (in many configurations). In this way, limiting outbound batch work to certain partitions (see e.g., items 608-610 described above) may help throttle inbound batch work as well.

As illustrated at block 650, the method may include categorizing a batch of work items to be performed as being work items of a particular work type. For instance, the batch of work items may be a type of work (e.g., inbound batch work items) associated with one of the priority levels illustrated in FIG. 5. As illustrated at block 652, the method may include identifying the commit latency threshold that corresponds to the particular work type of the batch. For instance, the method may include evaluating table 500 to determine the commit latency threshold corresponding to the work type of the batch. At block 654, the method may include determining whether any of the database partitions have commit latencies that are larger than the identified commit latency threshold. For example, as inbound batch work items may span multiple different database partitions, in some cases it may not be worthwhile or efficient to perform only some of these work items. For instance, if only some of such work items are performed on some partitions, resources may have to be expended on the increased complexity of tracking the work items that have yet to be performed. Accordingly, as illustrated by the positive output of block 654, if it is determined that any of the database partitions have commit latencies that are larger than the identified commit latency threshold, then the method may include postponing processing of the entire batch or work items in order to reduce the load on the database (656). As illustrated by the negative output of block 654, the method may include performing the work items from the batch without the postponement of block 656.

Note that in the embodiments described herein, when a work item or batch of items is postponed to reduce database load, the work item(s) may be evaluated again by the techniques described herein in order to determine whether the work item should be postponed (again) or performed by the service. In other words, in some cases, work item(s) may be evaluated and postponed multiple times before ultimately being performed. In one example, queued work items may be postponed by placing the items back on the queue (or simply leaving them on the queue) to be re-evaluated at some later time.

Payment Service Example

Figure 7:
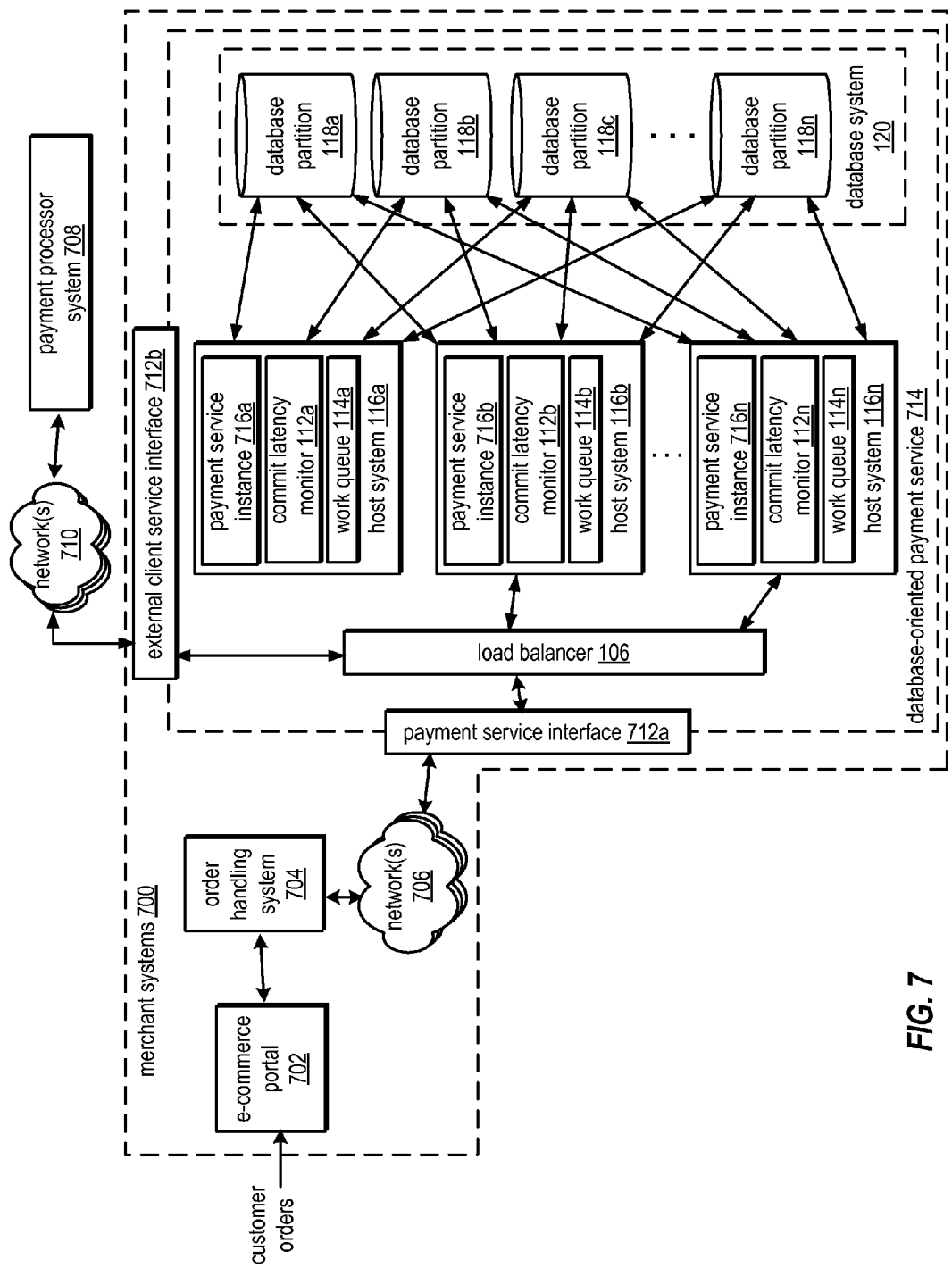
FIG. 7 illustrates a block diagram of an example system configuration including a database-oriented payment service, according to some embodiments.

In various embodiments, the techniques described herein may be implemented as part of a database-oriented payment service configured to process requests from internal clients and external clients. An example of such a service is illustrated in FIG. 7. Note that in FIG. 7, the elements being like-numbered with elements of FIG. 1 may be assumed to be similar to those elements of FIG. 1. In the illustrated embodiment, the database-oriented payment service is illustrated as database oriented payment service 714, which may be a service offered by a merchant, such as a merchant that owns and/or controls merchant systems 700.

In various embodiments, the merchant may operate an electronic commerce ("e-commerce") portal 702 on one or more computer systems. For instance, in some embodiments, a merchant may operate one or more network-accessible servers that implement an electronic commerce portal where customers may browse a catalog of product detail pages. Such a portal may enable the customers to select one or more items for purchase as part of a customer order submitted to the merchant. In various embodiments, the merchant may receive orders for one or more items through other channels.

In various embodiments, when a customer makes a purchase through e-commerce portal 702, the e-commerce portal may send transaction information to order handling system 704. For a given customer order, this transaction information may specify the quantity of funds needed, the payment instrument to be used (e.g., a credit card, debit card, or gift card) and any relevant information needed to charge or debit the funds from the account associated with the payment instrument (e.g., the instrument holder's name, the instrument's expiration date, a card security code (e.g., a CVV code), etc.). In various embodiments, some or all of this information may be included within a transaction initiation request sent by order handling system 704 to payment service interface 712a over one or more electronic network(s) 706. In various embodiments, this type of request may be referred to as an internal request since the request originates from one of the merchant's systems. In some embodiments, the order handling system may designate one transaction as payment for an entire order. In other cases, order handling system may designate multiple transactions as collectively representing payment for an entire order. In one example, the merchant may fulfill orders through a network of materials handling facilities. In this example, the order handling system may split an order into multiple transactions based on how the order is actually processed in the merchant's network of facilities. In one non-limiting example, for an order including multiple items, shipments including different subsets of those items may be prepared at different facilities within the merchant's network. In this example, the order handling system may structure the transactions for the order such that each shipment is handled by a separate transaction. In other cases, all items of an order may be handled by a single transaction irrespective of where the shipments for that order are prepared.

When payment service interface 712a receives a transaction initiation request from order handling system 704, the interface may forward the request to load balancer 106, which may then distribute the request to a particular host system according to techniques similar to those described above with respect to FIG. 1. In the illustrated example, it will be assumed that the request is sent to host system 116a. As illustrated, host system 116a may include a payment service instance 716a. In response to the transaction initiation request, the payment service instance may create a record for the transaction within one of the database partitions. In various embodiments, this record creation may be designated as being a very high priority task (e.g., priority level 1 of table 500) and thus exempt from being subject to back-off. For instance, since the creation of a transaction record within database system 120 is performed prior to obtaining a fund reservation for a customer purchase, the system may prioritize this type of database operation as the highest priority in order to avoid negatively impacting the customer experience.

For instance, ordered items may not be shipped until funds have been reserved as payment for such items; generally the faster funds are reserved the faster the item may be shipped to the customer in various embodiments.

Also in response to a transaction initiation request, payment service instance 716a may send a request to authorize (e.g., reserve) funds for the customer purchase to payment processor system 708. Payment processor system 708 may communicate with a financial institution (e.g., a bank or credit card company) to secure the funds for the purchase. In response to successfully reserving the funds, payment processor system 708 may notify the merchant that the reservation of funds was successful by sending a notification via network 710 and a second interface, illustrated as external client service interface 712b. In response, payment service instance 716a may update the state of the transaction within one of database partitions 118. In various embodiments, this state update may also be designated as being a very high priority task (e.g., priority level 1 of table 500) and thus exempt from being subject to back-off according to various embodiments (e.g., in order to avoid delaying shipment and avoid negatively impacting the customer experience).

In various embodiments, there may also be a number of service requests specifying work items that are subject to being backed-off according to the techniques described herein. Examples of such work items may include but are not limited to receiving and/or queuing requests to begin transaction settlement with the payment processor system 708, actually sending the settlement request to the payment processor system 708, and/or receiving response to the settlement request from payment processor system 708. Each of these types of work items is described in more detail below.

In various embodiments, internal systems (e.g., order handling system 704 or another one of the merchant's systems) may submit requests to begin transaction settlement. For instance, in one embodiment, order handling system (or another merchant system) may determine that a customer order corresponding to a transaction has been shipped. In some configurations, this shipment may trigger settlement of the transaction. Accordingly, in response to determining that the customer order has shipped, order handling system 704 may send a request to settle the transaction to the payment service and such request may be routed to one of the host systems (e.g., host system 116a). In various embodiments, the payment service instance 716a may utilize any of the techniques described herein to determine whether the work item of receiving and/or queuing the request should be backed-off (e.g., postponed). If no postponement is in order, the payment service instance may proceed to accept the work item and queue such item in work queue 114a. However, in cases where the payment service instance 716a determines that the receipt and/or queuing of the work item is to be backed-off, the payment service instance may send to order handling system 704 (or whichever system originally sent the request) a message that indicates the request was not recorded and/or that the request should be retried at a later time. In various embodiments, these postponement techniques may enable the database system 120 to recover from any transient period of database load and thus decrease the probability of a database failure. Generally, this type of work item (e.g., the receipt/queuing of a settlement request to the payment processor) may be categorized as having a higher priority (see e.g., table 500) than the work items of actually sending the settlement request to the payment processor system 708, and/or receiving a response to the settlement request from payment processor system 708.

In cases where the settlement request work item is queued within the host system, the host system may at some later point determine whether to perform the work item of sending the settlement request to payment processor system 708. For instance, since the work item may be queued on work queue 114a, the payment service instance 716a may perform a method similar to that of FIG. 6A to determine whether the work item of sending the settlement request to the payment processor should be backed-off (e.g., postponed). If no postponement is in order, the payment service instance may proceed to send the settlement request to the payment processor system. In various embodiments the settlement request may specify the actual amount that is to be charged or debited to the customer's account, which may in some cases be less than the amount that was originally authorized. In various embodiments, in cases where the payment service instance 716a determines that the work item of sending the settlement request is to be backed-off (e.g., postponed), the payment service may leave the work item on work queue 114a to be processed at a later time. In various embodiments, these postponement techniques may enable the database system 120 to recover from any transient period of database load and thus decrease the probability of a database failure. Generally, this type of work item (e.g. the work item of actually sending the settlement request to the payment processor system 708) may be categorized as having a higher priority (see e.g., table 500) than the work item of receiving a response to the settlement request from payment processor system 708 (described below).

In cases where the settlement request is sent to the payment processor system, the host system may at some later point receive a response from payment processor system 708 indicating success or failure of the settlement. In various embodiments, the payment service instance 716a may utilize any of the techniques described herein to determine whether the work item of receiving and/or queuing the notification of settlement success/failure should be backed-off (e.g., postponed). If no postponement is in order, the payment service instance may proceed to accept the work item and queue such item in work queue 114a. However, in cases where the payment service instance 716a determines that the receipt and/or queuing of the settlement response is to be backed-off, the payment service instance may send to order handling system 704 (or whichever system originally sent the request) a message that indicates the settlement response was not recorded and/or that the settlement response should be resent at a later time. In cases where the settlement response is accepted and queued on work queue 114a, the payment service may again evaluate whether to back-off the work item (e.g., according to methods of FIGS. 6A-6B) using techniques similar those described above for batched work items. In cases where the work item is to be performed, the service instance may update the transaction state in a respective database partition to indicate that transaction settlement for the customer's order has been completed.

Opportunistically Performing Extra Work Based on Commit Latency

In various embodiments described above, work items may be postponed based on commit latency of database partitions. In some cases, similar techniques may be utilized to opportunistically perform extra work when the health of the database system affords such flexibility. For instance, as described above, each host system may be configured to perform batches of work, such as batches removed from work queues 114a-114n. In various embodiments, this batched processing may adhere to some form of a schedule, either absolute (e.g., every hour on the hour), relative (e.g., each one our period since the last batched processing was performed), or a similar schedule. In some embodiments, after a host's service instance has completed the processing of a scheduled batch of work items, the service instance may check the current median (or mean) commit latency values (e.g., as specified by tables 200 or 300, which may be maintained on each host) of the multiple database partitions. If the commit latency values are below a configurable "extra work" threshold, the service instance on the host may actually perform additional work items from the work queue that were not expected to be performed until a scheduled time in the future. In other words, if the service instance determines that the commit latencies values indicate the database partitions are healthy, the service instances may utilize extra database capacity to perform extra work, which may also reduce the risk of straining the database partitions in the immediate future.

Example Computer System

Various embodiments of the system and method for distributed back-off in a database-oriented environment, as described herein, may be executed on one or more computer systems, which may interact with various other devices. Note that any component, action, or functionality described above with respect to FIGS. 1-7 may be implemented on one or more computers configured as computer system 800 of FIG. 8, according to various embodiments. For instance, in one embodiment, a computer similar to computer system 800 may be utilized to implement any of host systems 116*a* described above. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 may be configured to implement any functionality of the clients or merchant systems described above including but not limited to service instances (e.g., service instance 110*a* or payment service instance 716*a*) and commit latency monitors (e.g., commit latency monitor 112*a*). Additionally, data 832 of memory 820 may store any of the information or data structures described above, including but not limited to work queues (e.g., work queue 114*a*). In some embodiments, program instructions and/or data may be received, sent or stored upon different types of computer-accessible media or on similar media separate from system memory 820 or computer system 800. While computer system 800 is described as implementing the functionality of hosts, any of the items described above (e.g., clients, e-commerce portals, payment processor systems, service interfaces, load balancers, database systems, database partitions, etc.) may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network 885 (e.g., any element of FIG. 1-7) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In some embodiments, network(s) 102 of FIG. 1 and network 706 and 710 of FIG. 7 may include one or more networks configured in a manner similar to that of network 885. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Figure 8:
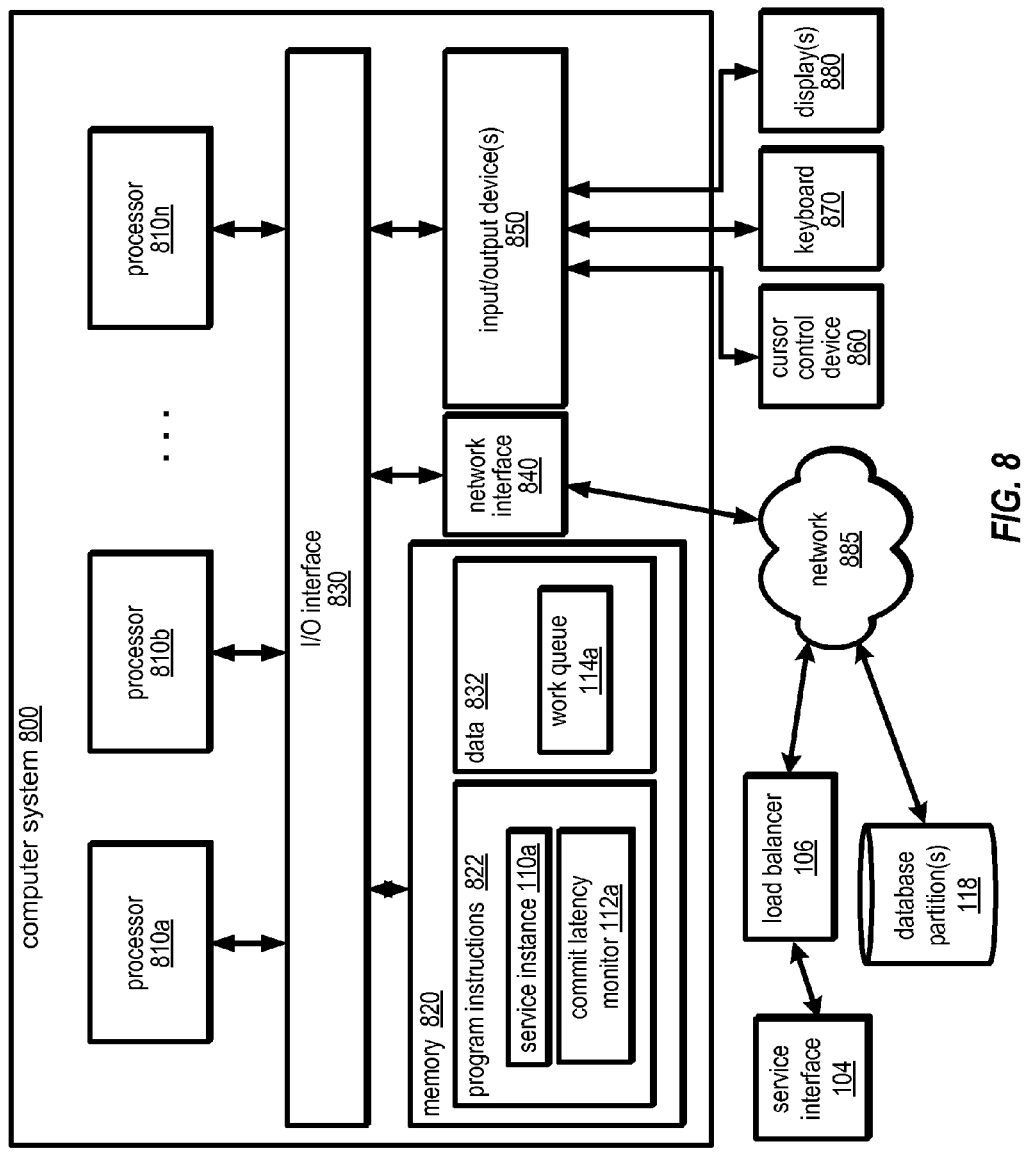
FIG. 8 illustrates one example of a computer system suitable for implementing various elements of the system and method for distributed back-off in a database-oriented environment, according to some embodiments.

As shown in FIG. 8, memory 820 may include program instructions 822 configured to implement any element or action described above. In one embodiment, the program instructions may implement the methods described above, such as the methods illustrated by FIGS. 4 and 6. In other embodiments, different elements and data may be included. Note that data 832 may include any data or information described above, including but not limited to the information of host systems 116*a-n* or database partitions 118*a-n*.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

The invention claimed is:

1. A system, comprising:
   a database system comprising multiple database partitions configured to store data associated with one or more work items associated with processing requests made through a service interface;
   a plurality of host computers configured to perform work items requested through the service interface, wherein performing at least some of said work items includes initiating one or more commit operations on one or more of said database partitions, wherein at least some of the commit operations comprise updating a state of a transaction processed by the service;
   wherein one or more of the host computers are configured to generate, on a per-host, per-database partition basis, commit latency values for the database partitions, wherein a commit latency value for a particular database partition is dependent on the latency of one or more previous commit operations directed to that particular database partition;
   wherein a given one of the host computers is configured to:
      determine, for a particular work item to be initiated on a respective one of the database partitions, that the given host computer's commit latency value for the respective database partition exceeds a commit latency threshold; and
      in response to said determine, reduce a load of work items on the respective database partition, wherein to reduce the load of work items, the given one of the host computers is configured to:
         postpone the particular work item on the respective database partition; and
         perform the particular work item after the postponement.

2. The system of claim 1, wherein another one of the host computers is configured to:
   determine, for another work item to initiated on the respective database partition, that the another host computer's commit latency value for the respective database partition does not exceed the commit latency threshold; and
   perform the another work item without postponement.

3. The system of claim 1, wherein in further response to determining that the commit latency value for the respective database partition exceeds the commit latency threshold, the given host computers is further configured to:
   postpone the particular work item until the respective commit latency value for the particular database partition does not exceed the commit latency threshold.

4. The system of claim 1, wherein in further response to determining that the commit latency value for the respective database partition exceeds the commit latency threshold, the given host computer is further configured to:
   determine a new commit latency value for the particular database partition;
   compare the new commit latency value with the commit latency threshold; and
   if the new commit latency value is above the commit latency threshold, repeat said postponement of the particular work item prior to said performing the particular work item.

5. The system of claim 1, wherein to perform at least some work items, the one or more host computers are each configured to:
communicate with a payment processor system to reserve or settle funds for a purchase transaction; and
receive, from the payment processor system, an indication that a quantity of funds have been reserved or settled for the purchase transaction, wherein the state of the purchase transaction is updated within at least one of the multiple database partitions to indicate that the quantity of funds have been reserved or settled.

6. The system of claim 5, wherein in response to determining that the commit latency value for the respective database partition exceeds the commit latency threshold, the one or more host computers are configured to:
postpone said communicating with the payment processor system until the commit latency value for the respective database partition does not exceed the commit latency threshold.

7. The system of claim 1, wherein the work items are requested by clients via the service interface, wherein each work item is associated with a requesting one of the clients, and wherein in response determining that the particular work item is to be postponed, the given host computer is further configured to:
send to the requesting client a message that indicates one or more of: the request was not processed, or the request should be resubmitted at a later time.

8. The system of claim 1, wherein the one or more host computers each comprise a commit latency monitor configured to:
for each work item performed by a respective host computer:
measure a latency value for respective work item; and
generate the commit latency value for the database partition to which the respective work item is directed using the measured latency value for the respective work item.

9. The system of claim 8, wherein a respective commit latency monitor is configured to generate a commit latency value for the given database partition as being the result of a statistical analysis of multiple measures of latency of previous commit operations directed to that given database partition.

10. The system of claim 9, wherein the statistical analysis comprises determining the average latency of a sample comprising the multiple measures of latency of the previous commit operations.

11. The system of claim 9, wherein the statistical analysis comprises determining the median latency of a sample comprising the multiple measures of latency of the previous commit operations.

12. A non-transitory computer-readable storage medium, storing program instructions computer-executable on a computer to:
perform work items requested by clients through a service interface, wherein performing at least some of the work items includes initiating one or more commit operations on one or more database partitions;
generate, on a per-host, per-database partition basis, commit latency values for the database partitions, wherein a commit latency value for a particular database partition is dependent on the latency of one or more previous commit operations directed to that particular database partition;
categorize the work items into a plurality of work categories, wherein each respective work category has an associated priority level;
in response to determining that the priority level associated with the work category for a given work item is above a highest priority threshold, perform the given work item without a postponement;
in response to determining that the priority level associated with the work category for the given work item is not above a highest priority threshold and that a current commit latency value for a particular database partition to which the given work item is directed exceeds a commit latency threshold for the priority level associated with the work category for the given work item:
reduce a load of work items sent to the database system, wherein to reduce the load of work items comprises:
postpone the given work item on the database system; and
perform the given work item after the postponement.

13. The non-transitory computer-readable storage medium of claim 12, wherein the program instructions are further computer-executable to:
determine that the current commit latency value for the particular database partition does not exceed a commit latency threshold for a different priority level for a work category associated with another work item; and
perform the another work item without postponement prior to said performing the given work item after the postponement.

14. The non-transitory computer-readable storage medium of claim 12, wherein the highest priority threshold does not have a commit latency threshold.

15. The non-transitory computer-readable storage medium of claim 12, wherein the program instructions are further computer-executable to query a commit latency monitor to obtain the current commit latency value.

16. The non-transitory computer-readable storage medium of claim 12, wherein the program instructions are further computer-executable to evaluate and postpone the given work item at least one additional time prior to said performing the given work item.

17. A method, comprising:
performing, by one or more computers:
performing work items requested through a service interface, wherein performing at least some of the work items includes initiating one or more commit operations on one or more database partitions;
generating, on a per-host, per-database partition basis, commit latency values for the database partitions, wherein a commit latency value for a particular database partition is dependent on the latency of one or more previous commit operations directed to that particular database partition; and
reducing a load of commit operations for the particular database partition based at least partly on the commit latency value for the particular database partition exceeding a commit latency threshold, wherein said reducing the load of commit operations comprises postponing work items for the particular database partition.

18. The method of claim 17, further comprising:
categorizing the work items into work categories, wherein each respective work category has an associated priority level;
in response to determining that the associated priority level for a work category of a given work item is above a highest priority threshold:

performing the given work item without postponement;

in response to determining that the associated priority level for the work category of the given work item is not above the highest priority threshold and that a current commit latency value for the particular database partition to which the given work item is directed exceeds a commit latency threshold for the associated priority level:

postponing the given work item to reduce load on the database system; and performing the given work item after the postponement.

19. The method of claim 18, further comprising:

determining that the current commit latency value for the particular database partition does not exceed a commit latency threshold for a work category associated with another work item; and performing the another work item without postponement and prior to said performing the given work item.

20. The method of claim 17, wherein the current commit latency value for the particular database partition are generated as being the result of a statistical analysis of multiple latencies of previous commit operations directed to that particular database partition.

\* \* \* \* \*